US009964215B2

(12) United States Patent
Itadani

(10) Patent No.: US 9,964,215 B2
(45) Date of Patent: May 8, 2018

(54) SLIDING COMPONENT

(71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 510 days.

(21) Appl. No.: 14/419,438

(22) PCT Filed: Dec. 4, 2013

(86) PCT No.: PCT/JP2013/082537
§ 371 (c)(1),
(2) Date: Feb. 3, 2015

(87) PCT Pub. No.: WO2014/103631
PCT Pub. Date: Jul. 3, 2014

(65) Prior Publication Data
US 2015/0184752 A1 Jul. 2, 2015

(30) Foreign Application Priority Data

Dec. 25, 2012 (JP) .................................. 2012-280557

(51) Int. Cl.
*F16J 15/34* (2006.01)
(52) U.S. Cl.
CPC ................................. *F16J 15/3412* (2013.01)
(58) Field of Classification Search
CPC ... F16J 15/3404; F16J 15/3408; F16J 15/3412
See application file for complete search history.

(56) References Cited

U.S. PATENT DOCUMENTS 3,695,789 A * 10/1972 Jansson ................. F01C 21/003
277/361
3,744,805 A * 7/1973 Heinrich .............. F16J 15/3412
277/400

(Continued)

FOREIGN PATENT DOCUMENTS

CN 2534429 Y 2/2003
JP S59-231269 A 12/1984
(Continued)

OTHER PUBLICATIONS

International Search Report dated Jan. 7, 2014, issued for International application No. PCT/JP2013/082537.
(Continued)

*Primary Examiner* — Vishal A Patel
(74) *Attorney, Agent, or Firm* — Law Office of Katsuhiro Arai

(57) ABSTRACT

A sliding component is characterized in that the sealing face of one of a pair of sliding parts that slide relative to each other is provided with a first pumping groove that is open to the high-pressure fluid side but isolated from the low-pressure fluid side by a seal area and also angled to discharge the fluid toward the high-pressure fluid side by sliding relative to the mating sealing face, as well as a second pumping groove that is open to the low-pressure fluid side but isolated from the high-pressure fluid side by a seal area and also angled to discharge the fluid toward the high-pressure fluid side by sliding relative to the mating sealing face, wherein the low-pressure fluid-side end of the first pumping groove is arranged adjacent to the high-pressure fluid-side end of the second pumping groove.

2 Claims, 8 Drawing Sheets

(56) References Cited

U.S. PATENT DOCUMENTS

| | | | | |
|---|---|---|---|---|
| 4,407,513 | A * | 10/1983 | Takenaka | F16J 15/3412 277/400 |
| 4,423,879 | A * | 1/1984 | Takenaka | F16J 15/3412 277/400 |
| 5,092,612 | A * | 3/1992 | Victor | F16J 15/3412 277/400 |
| 5,222,743 | A * | 6/1993 | Goldswain | F16J 15/3412 277/400 |
| 5,312,117 | A * | 5/1994 | Takenaka | F16J 15/3412 277/400 |
| 5,368,314 | A * | 11/1994 | Victor | F16J 15/3412 277/400 |
| 5,496,047 | A * | 3/1996 | Goldswain | F16J 15/3412 277/400 |
| 7,258,346 | B2 * | 8/2007 | Tejima | F16J 15/3412 277/399 |
| 2013/0209011 | A1 | 8/2013 | Tokunaga | |

FOREIGN PATENT DOCUMENTS

| | | |
|---|---|---|
| JP | S61-082177 U | 5/1986 |
| WO | 2012/046749 A1 | 4/2012 |

OTHER PUBLICATIONS

Notification of Transmittal of Translation of the International Preliminary Report on Patentability (PCT/IB/338) dated Jul. 9, 2015, with International Preliminary Report on Patentability (PCT/IB/373) and Written Opinion of the International Searching Authority (PCT/ISA/237), for corresponding international application PCT/JP2013/082537.

First Notification of Reason for Refusal with Search Report issued by the State Intellectual Property Office of China dated Nov. 3, 2015 for Chinese counterpart application No. 201380041468.9.

A Second Office Action with Search Report issued by the State Intellectual Property Office of China dated Jun. 15, 2016 for Chinese counterpart application No. 201380041468.9.

* cited by examiner

[FIG. 1]
Prior Art
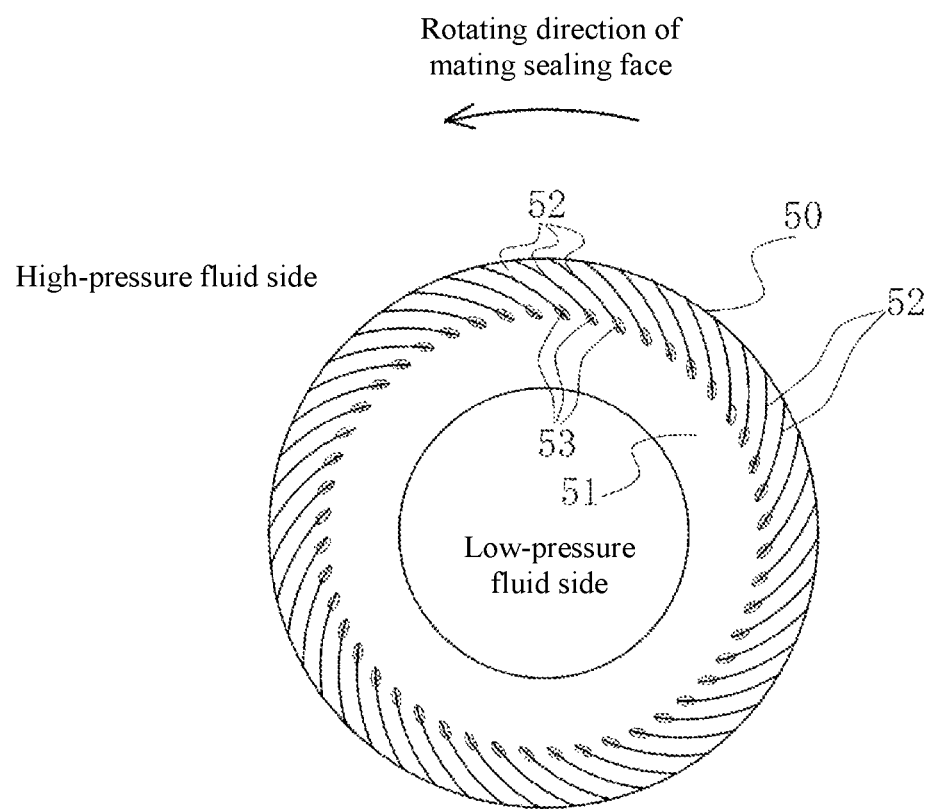

[FIG. 2]
Prior Art
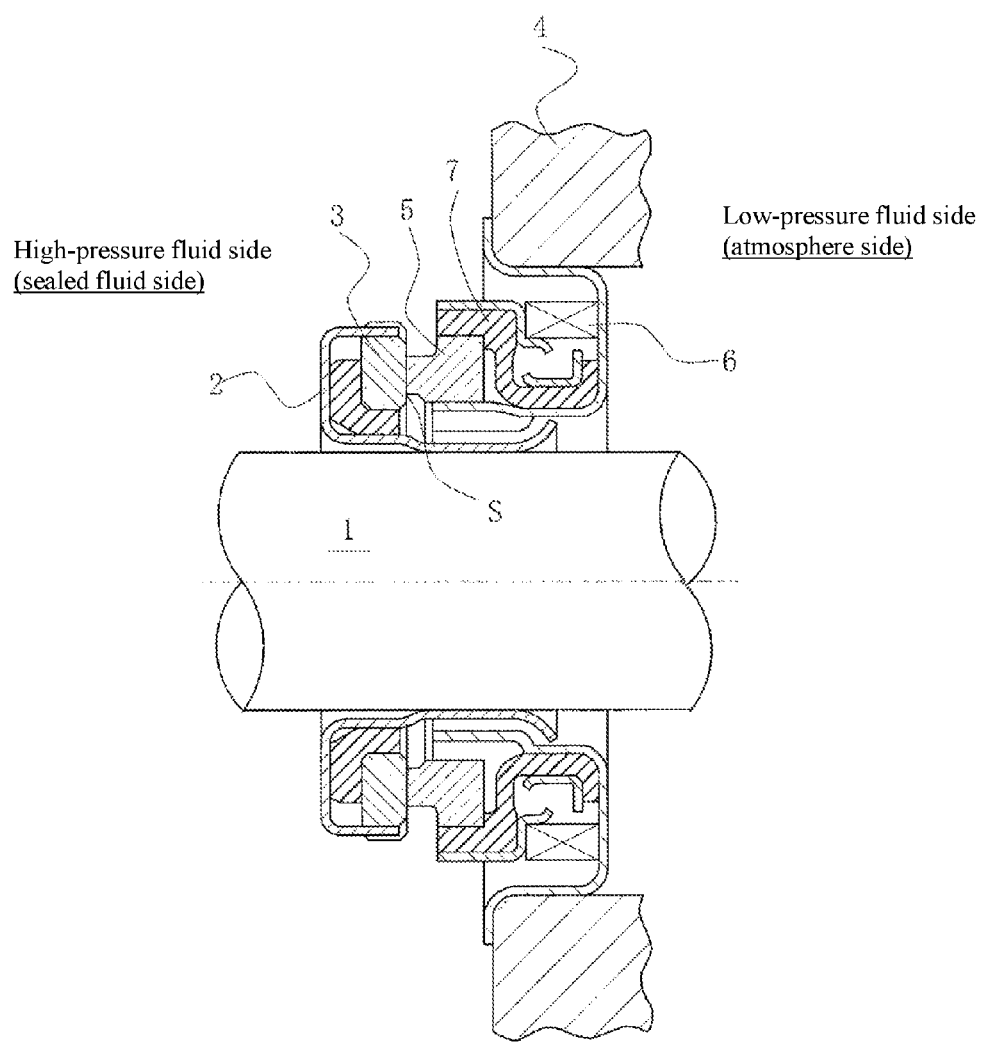

[FIG. 3]
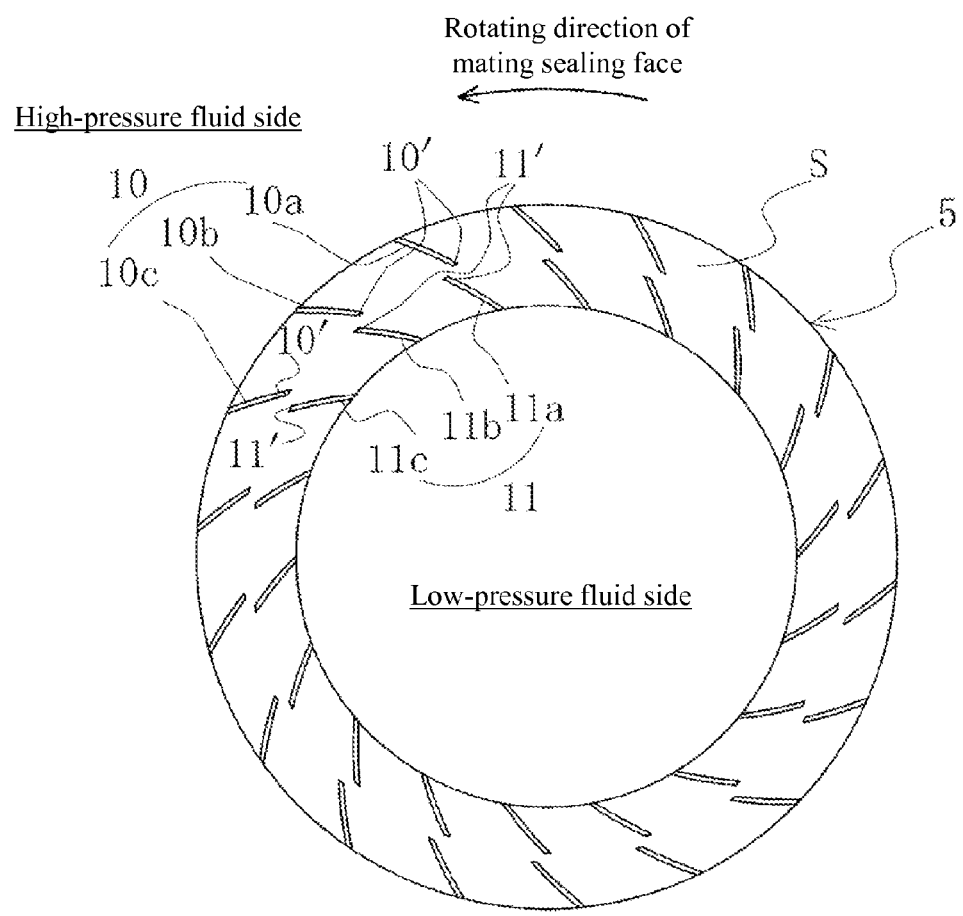

[FIG. 4]
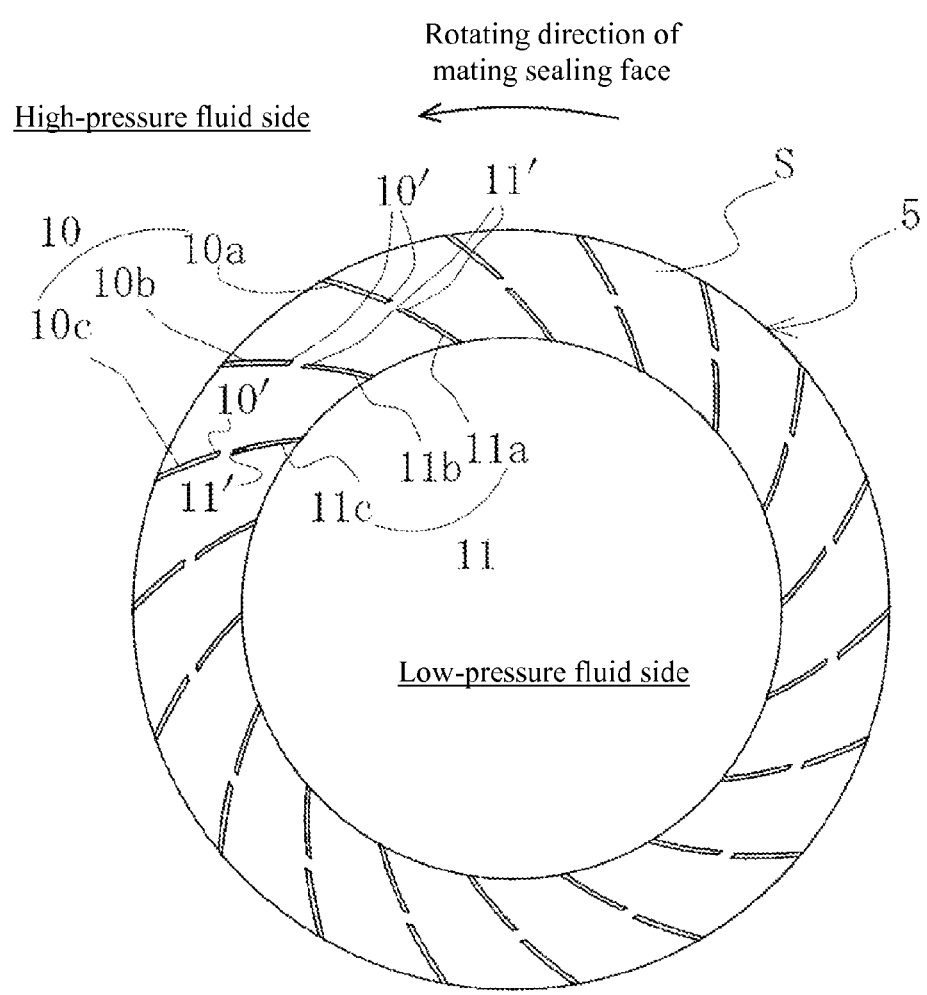

[FIG. 5]
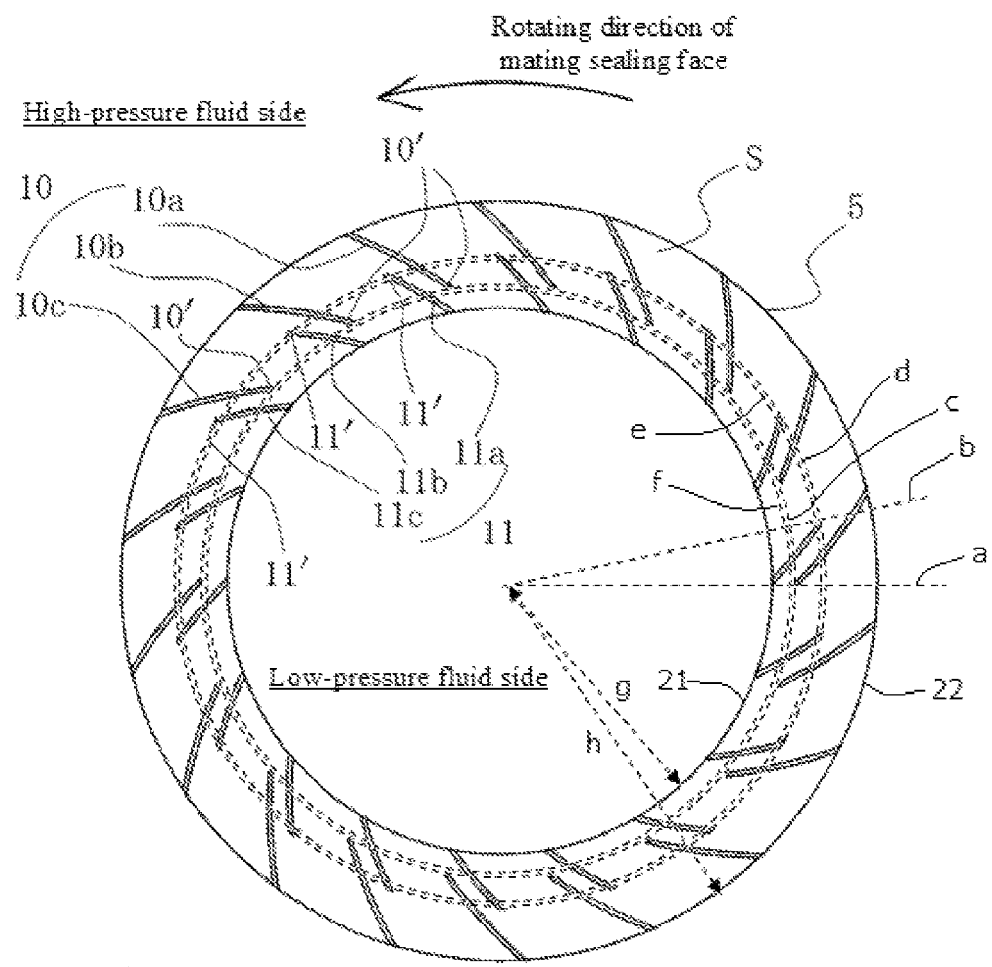

[FIG. 6]
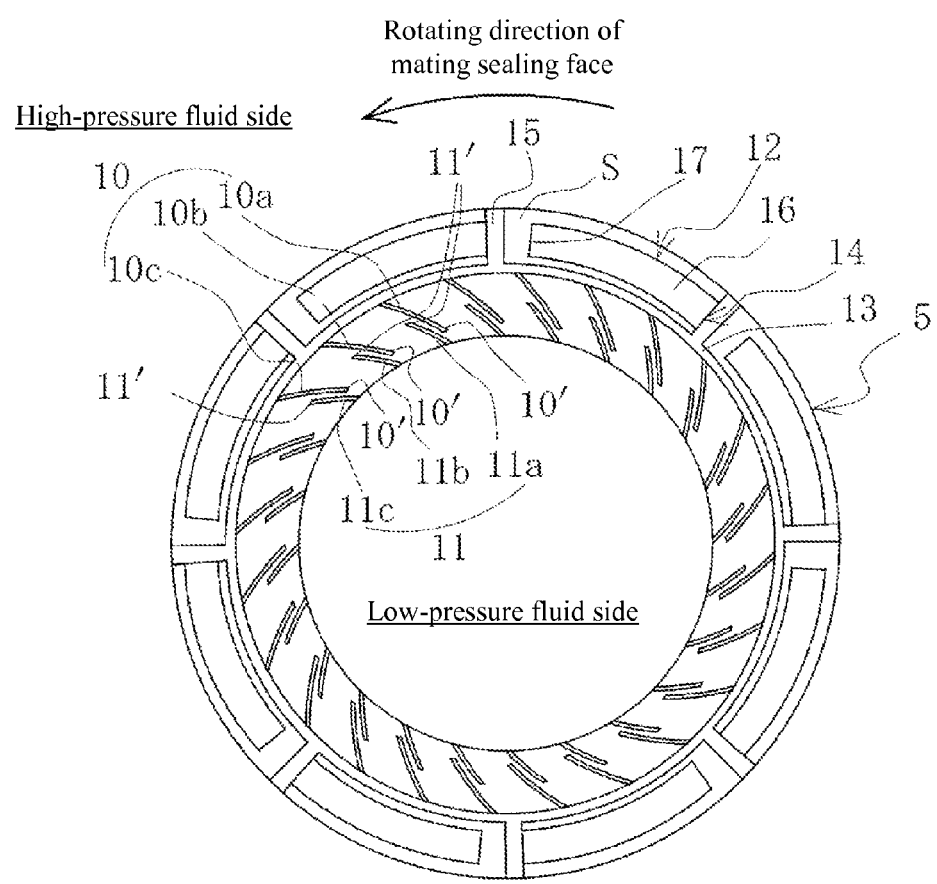

[FIG. 7]
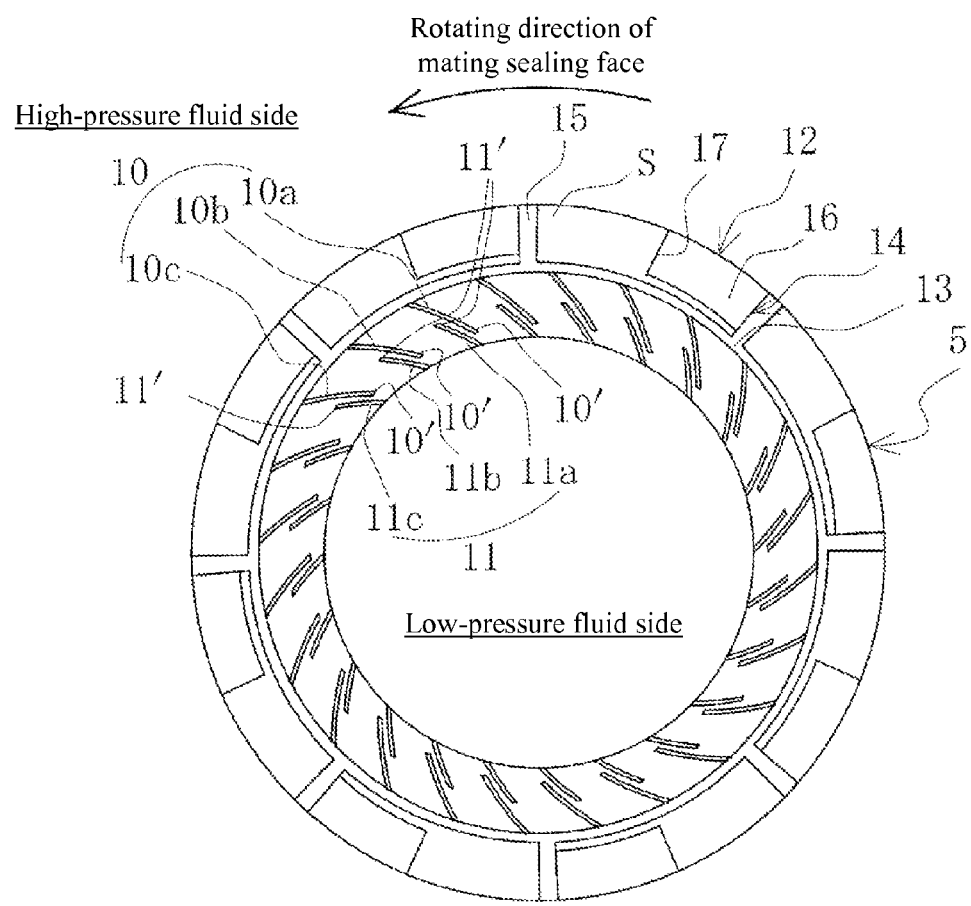

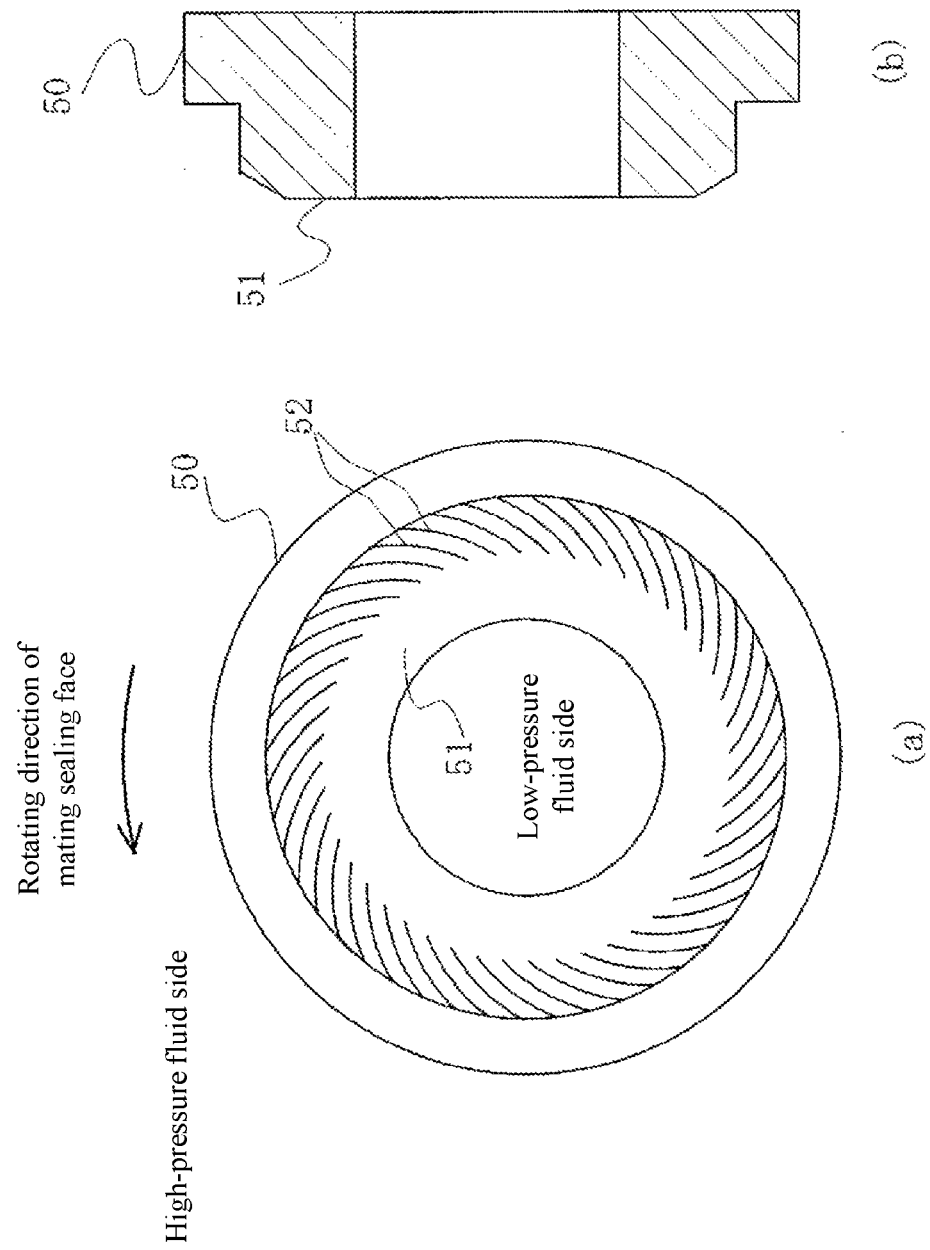
[FIG. 8]
Prior Art

SLIDING COMPONENT

This application is the U.S. National Phase under 35 U.S.C. § 371 of International Application PCT/JP2013/082537, filed Dec. 4, 2013, which claims priority to Japanese Patent Application No. 2012-280557, filed Dec. 25, 2012. The International Application was published under PCT Article 21(2) in a language other than English.

TECHNICAL FIELD

The present invention relates to a sliding component suitable for mechanical seals, bearings and other sliding areas. In particular, the present invention relates to a seal ring, bearing or other sliding component that must reduce friction by allowing a fluid to be present in between the sliding faces, while preventing the fluid from leaking out of the sealing faces.

BACKGROUND ART

The performance of a mechanical seal, which is an example of a sliding component, is evaluated based on the leakage rate, wear rate and torque. Mechanical seals of prior arts have achieved greater performance in the form of low leakage, long life and low torque by optimizing their sealing material and roughness of sealing faces. However, the ever-growing awareness of environmental issues in the market in recent years has created a demand for mechanical seals offering even higher performance and a consequent need to develop technologies that go beyond the scope of prior arts. One prior art relating to a mechanical seal is such that, as shown in FIG. 8, spiral grooves 52 are provided on a sealing face 51 of a sliding component 50 and the pumping action of the spiral grooves 52 is utilized to push back to the high-pressure fluid side a sealed fluid that tends to leak toward the low-pressure fluid side, thereby improving the sealing function of the sealing face (refer to Patent Literature 1, for example).

PRIOR ART LITERATURES

Patent Literatures

Patent Literature 1: Japanese Utility Model Laid-open No. Sho 61-82177 (FIGS. 1 and 2)

SUMMARY OF INVENTION

Problems to be Solved by Invention

Under the aforementioned prior art, the sealing face 51 is provided with spiral grooves 52 that are angled to discharge the fluid toward the high-pressure fluid side by sliding relative to the mating sealing face, where the viscous pumping effect of the spiral grooves 52 is used to push back the fluid toward the high-pressure fluid side to prevent it from leaking, but the inventor of the present invention has confirmed through experimentation that, with this type of mechanical seal, vaporous cavitation would occur at the low-pressure fluid-side end (upstream area in terms of the flow of fluid as it results from motion relative to the mating sealing face; or inner periphery side in FIG. 1) 53 of the spiral groove 52 depending on the balance of pumping effect and leakage, as shown in FIG. 1. In addition, the inventor of the present invention has revealed through experimentation that, under certain conditions such as when a silicate coolant is used as the sealed fluid, deposits generate in the spiral grooves 52 at the low-pressure fluid-side end (upstream area in terms of the flow of fluid as it results from motion relative to the mating sealing face; or inner periphery side in FIG. 1) 53 where vaporous cavitation occurs and then attach to/accumulate on the sealing face 51 to reduce sealability.

An object of the present invention is to provide a sliding component having a sealing face with an improved sealing function by preventing vaporous cavitation that would otherwise occur at the low-pressure fluid-side end (upstream area in terms of the flow of fluid as it results from motion relative to the mating sealing face) of a pumping groove (such as a spiral groove) formed on the sealing face.

Means for Solving the Problems

Principles

Under the present invention, the sealing face of at least one of a pair of sliding parts is provided with a pumping groove (such as a spiral groove) that is open to the high-pressure fluid side (sealed fluid side) and angled to discharge the fluid toward the high-pressure fluid side by sliding relative to the mating sealing face, as well as a pumping groove (such as a spiral groove) that is open to the low-pressure fluid side (such as the atmosphere side) and angled to discharge the fluid toward the high-pressure fluid side by sliding relative to the mating sealing face. The pumping groove open to the low-pressure fluid side (such as the atmosphere side) suctions in any fluid present on the low-pressure fluid side, while generating dynamic pressure near the end of the pumping groove on the high-pressure fluid side, and this dynamic pressure is used to relieve the negative pressure at the low-pressure fluid-side end (upstream area in terms of the flow of fluid as it results from motion relative to the mating sealing face) of the pumping groove open to the high-pressure fluid side, in order to prevent vaporous cavitation from occurring. If no fluid is present on the low-pressure fluid side, air on the atmosphere side is introduced to relieve the negative pressure at the low-pressure fluid-side end (upstream area in terms of the flow of fluid as it results from motion relative to the mating sealing face) of the pumping groove open to the high-pressure fluid side, in order to prevent vaporous cavitation from occurring.

Means

To achieve the aforementioned object, firstly, the sliding component proposed by the present invention is characterized in that the sealing face of at least one of a pair of sliding parts that slide relative to each other is provided with a first pumping groove that is open to the high-pressure fluid side but isolated from the low-pressure fluid side by a seal area (indicating a smooth area of a sealing face; the same applies hereinafter) and also angled to discharge the fluid toward the high-pressure fluid side by sliding relative to the mating sealing face, as well as a second pumping groove that is open to the low-pressure fluid side but isolated from the high-pressure fluid side by a seal area and also angled to discharge the fluid toward the high-pressure fluid side by sliding relative to the mating sealing face, wherein the low-pressure fluid-side end of the first pumping groove is arranged adjacent to the high-pressure fluid-side end of the second pumping groove.

According to these features, negative pressure near the low-pressure fluid-side end of the first pumping groove is relieved to prevent vaporous cavitation from occurring, which in turn prevents generation of deposits and consequent attachment and accumulation of foreign matter to/on the sealing face, thereby allowing the sealability of the sealing face to be maintained in a stable manner.

In addition, secondly, the sliding component proposed by the present invention is characterized in that, with respect to the first features, the first pumping groove and second pumping groove are formed in spiral shapes.

According to these features, stable sealability can be achieved.

In addition, thirdly, the sliding component proposed by the present invention is characterized in that, with respect to the first or second features, the first pumping groove and second pumping groove are respectively provided in plurality in the circumferential direction and the first pumping grooves and the respective second pumping grooves are arranged as pairs.

According to these features, negative pressure near the low-pressure fluid-side end of the first pumping groove can be relieved efficiently and reliably to prevent vaporous cavitation from occurring.

In addition, fourthly, the sliding component proposed by the present invention is characterized in that, with respect to the third features, each pair of pumping grooves comprising the first pumping groove and second pumping groove is arranged in such a way that the first pumping groove is positioned on the upstream side of the second pumping groove in the circumferential direction.

According to these features, the negative pressure generated by the first pumping groove can be relieved efficiently by means of the dynamic pressure generation effect of the second pumping groove on the downstream side, to prevent vaporous cavitation from occurring.

In addition, fifthly, the sliding component proposed by the present invention is characterized in that, with respect to the third features, each pair of pumping grooves comprising the first pumping groove and second pumping groove is arranged in such a way that the first pumping groove is arranged along roughly the same line with the second pumping groove in a radial direction.

According to these features, the pressure at the negative pressure origin of the first pumping groove can be raised by means of the dynamic pressure generated by the second pumping groove, to suppress occurrence of vaporous cavitation.

In addition, sixthly, the sliding component proposed by the present invention is characterized in that, with respect to the fourth or fifth features, each pair of pumping grooves comprising the first pumping groove and second pumping groove is arranged in such a way that the low-pressure fluid-side end of the first pumping groove is separated from the high-pressure fluid-side end of the second pumping groove in a radial direction.

According to these features, the seal area width needed to prevent stationary leakage can be defined between the inner periphery-side end of the first pumping groove and the outer periphery-side end of the second pumping groove, and consequently stable sealability can be achieved in a stationary state.

In addition, seventhly, the sliding component proposed by the present invention is characterized in that, with respect to the fourth features, each pair of pumping grooves comprising the first pumping groove and second pumping groove is formed in such a way that the low-pressure fluid-side end of the first pumping groove overlaps with the high-pressure fluid-side end of the second pumping groove in a radial direction.

According to these features, occurrence of vaporous cavitation can be prevented more reliably by means of the dynamic pressure generating near the high-pressure fluid-side end of the second pumping groove, even when such vaporous cavitation occurring near the low-pressure fluid-side end of the first pumping groove is expansive in a radial direction.

In addition, eighthly, the sliding component proposed by the present invention is characterized in that, with respect to any of the first through seventh features, the sealing face on the high-pressure fluid side of the first pumping groove is provided with a positive-pressure generation mechanism as well as a pressure-release groove positioned between the first pumping groove and positive-pressure generation mechanism, where the positive-pressure generation mechanism and pressure-release groove are open to the high-pressure fluid side and the high-pressure fluid-side end of the first pumping groove is open to the pressure-release groove.

According to these features, negative pressure near the low-pressure fluid-side end of the first pumping groove is relieved and occurrence of vaporous cavitation is prevented, which in turn prevents generation of deposits and consequent attachment and accumulation of foreign matter to/on the sealing face, thereby allowing the sealability of the sealing face to be maintained in a stable manner, even when the sliding component is designed to enhance lubrication property with a positive-pressure generation mechanism provided on the sealing face that already has the first pumping groove.

Effects of Invention

The present invention provides excellent effects as described below.

(1) Negative pressure near the low-pressure fluid-side end of the first pumping groove is relieved to prevent vaporous cavitation from occurring, which in turn prevents generation of deposits and consequent attachment and accumulation of foreign matter to/on the sealing face, thereby allowing the sealability of the sealing face to be maintained in a stable manner.

(2) The first pumping groove and second pumping groove are formed in spiral shapes, and accordingly stable sealability can be achieved.

(3) The first pumping groove and second pumping groove are respectively provided in plurality in the circumferential direction and the first pumping grooves and the respective second pumping grooves are arranged as pairs, and accordingly negative pressure near the low-pressure fluid-side end of the first pumping groove can be relieved efficiently and reliably to prevent vaporous cavitation from occurring.

(4) Each pair of pumping grooves comprising the first pumping groove and second pumping groove is arranged in such a way that the first pumping groove is positioned on the upstream side of the second pumping groove in the circumferential direction, and accordingly the negative pressure generated by the first pumping groove can be relieved efficiently by means of the dynamic pressure generation effect of the second pumping groove on the downstream side, to prevent vaporous cavitation from occurring.

(5) Each pair of pumping grooves comprising the first pumping groove and second pumping groove is arranged in such a way that the first pumping groove is arranged along roughly the same line with the second pumping groove in a radial direction, and accordingly the pressure at the negative pressure origin of the first pumping groove can be raised by means of the dynamic pressure generated by the second pumping groove, to suppress occurrence of vaporous cavitation.

(6) Each pair of pumping grooves comprising the first pumping groove and second pumping groove is arranged in such a way that the low-pressure fluid-side end of the first pumping groove is separated from the high-pressure fluid-side end of the second pumping groove in a radial direction, and accordingly the seal area width needed to prevent stationary leakage can be defined between the inner periphery-side end of the first pumping groove and the outer periphery-side end of the second pumping groove, and consequently stable sealability can be achieved in a stationary state.

(7) Each pair of pumping grooves comprising the first pumping groove and second pumping groove is formed in such a way that the low-pressure fluid-side end of the first pumping groove overlaps with the high-pressure fluid-side end of the second pumping groove in a radial direction, and accordingly occurrence of vaporous cavitation can be prevented more reliably by means of the dynamic pressure generating near the high-pressure fluid-side end of the second pumping groove, even when such vaporous cavitation occurring near the low-pressure fluid-side end of the first pumping groove is expansive in a radial direction.

(8) Negative pressure near the low-pressure fluid-side end of the first pumping groove is relieved and occurrence of vaporous cavitation is prevented, which in turn prevents generation of deposits and consequent attachment and accumulation of foreign matter to/on the sealing face, thereby allowing the sealability of the sealing face to be maintained in a stable manner, even when the sliding component is designed to enhance lubrication property with a positive-pressure generation mechanism provided on the sealing face that already has the first pumping groove.

BRIEF DESCRIPTION OF DRAWINGS

FIG. 1 is a drawing that explains the problems of prior art.

FIG. 2 is a longitudinal section view showing one example of a mechanical seal pertaining to Example 1 of the present invention.

FIG. 3 is a sealing face of the sliding component pertaining to Example 1 of the present invention.

FIG. 4 is a sealing face of the sliding component pertaining to Example 2 of the present invention.

FIG. 5 is a sealing face of the sliding component pertaining to Example 3 of the present invention.

FIG. 6 is a sealing face of the sliding component pertaining to Example 4 of the present invention.

FIG. 7 is a sealing face of the sliding component pertaining to Example 4 of the present invention.

FIG. 8 is a drawing of prior art, where (a) is a front view of the sealing face of the sliding member, while (b) is aside section view of the sliding member.

MODES FOR CARRYING OUT THE INVENTION

Modes for carrying out the present invention are explained below based on examples by referring to the drawings. It should be noted, however, that the dimensions, materials, shapes, relative positions, and other aspects of the constituent parts as stated in these examples are not intended to limit the scope of the present invention to the foregoing, unless otherwise expressly stated.

Example 1

The sliding component pertaining to Example 1 of the present invention is explained by referring to FIGS. 2 and 3.

It should be noted that this example explains a mechanical seal, which is an example of a sliding component. Additionally, while the outer periphery side and inner periphery side of the sliding component constituting the mechanical seal are explained, in this example, as the high-pressure fluid side (sealed fluid side) and low-pressure fluid side (atmosphere side), respectively, this example is not at all limited to the foregoing and it can also be applied when the high-pressure fluid side and low-pressure fluid side are reversed.

FIG. 2 is a longitudinal section view showing one example of mechanical seal, where the mechanical seal is of the inside type that seals the sealed fluid on the high-pressure fluid side that tends to leak from the outer periphery of the sealing face toward the inner periphery direction, wherein the mechanical seal comprises: one sliding part being an annular rotating ring 3 which is provided via a sleeve 2 on a rotating shaft 1 side that drives a pump impeller (not illustrated) on the high-pressure fluid side in a manner rotatable together with the rotating shaft 1; and the other sliding part being an annular stationary ring 5 which is provided on a pump housing 4 in a non-rotatable manner but movable in the axial direction; and wherein the sliding parts slide against each other while in contact via their respective sealing faces S that have been mirror-surface finished by lapping, etc., by means of a coiled wave spring 6 that biases the stationary ring 5 in the axial direction and by means of bellows 7. In other words, this mechanical seal prevents the sealed fluid from flowing out of the outer periphery of the rotating shaft 1 toward the atmosphere side at the sealing faces S of the rotating ring 3 and stationary ring 5.

FIG. 3 shows the sealing face of the sliding component pertaining to Example 1 of the present invention, where the explanation of this example assumes that pumping grooves are formed on the sealing face of the stationary ring 5 in FIG. 2.

Note that the same explanation applies when pumping grooves are formed on the sealing face of the rotating ring 3.

In FIG. 3, the outer periphery side of the sealing face S of the stationary ring 5 represents the high-pressure fluid side, while the inner periphery side represents the low-pressure fluid side, such as the atmosphere side, and the mating sealing face is assumed to rotate in the counterclockwise direction.

The sealing face S is provided with first pumping grooves 10 that are open to the high-pressure fluid side but separated from the low-pressure fluid side by the smooth area (may be referred to as "seal area" under the present invention) of the sealing face S, while being angled to discharge the fluid toward the high-pressure fluid side by sliding relative to the mating sealing face. Additionally, the sealing face S is provided with second pumping grooves 11 that are open to the low-pressure fluid side but separated from the high-pressure fluid side by the smooth area of the sealing face S, while being angled to discharge the fluid toward the high-pressure fluid side by sliding relative to the mating sealing face. Also, a low-pressure fluid-side end 10' of the first pumping groove 10 is arranged adjacent to a high-pressure fluid-side end 11' of the second pumping groove 11.

The term "adjacent" used here will be explained later.

The first pumping groove 10 and second pumping groove 11 are formed as straight lines or curved lines that are angled to discharge the fluid toward the high-pressure fluid side by sliding relative to the mating sealing face. In this example, they are formed in spiral shapes along the rotating direction of the mating sealing face, by considering vibration, noise, etc. Additionally, the values of inclination angles, groove widths and groove depths of the first pumping groove 10 and second pumping groove 11 are determined optimally according to the type (viscosity, etc.) of the sealed fluid, pressure, or relative sliding speed, etc. The ratio of the radial-direction length of the first pumping groove 10 and that of the second pumping groove 11 is also determined according to a similar condition, but it may be set as "Length of the first pumping groove 10≥Length of the second pumping groove 11," for example.

The first pumping groove 10 and second pumping groove 11 are respectively provided in plurality in the circumferential direction. While FIG. 3 shows an example where 18 grooves are provided each at an equal pitch in the circumferential direction, 120 or more grooves may be provided each at an equal pitch, for example. In addition, preferably the first pumping grooves 10 and the respective second pumping grooves 11 are arranged as pairs. In FIG. 3, for example, the first pumping groove 10a and second pumping groove 11a are arranged as a pair so that the first pumping groove 10a and second pumping groove 11a generate hydrodynamic effects.

In FIG. 3, each pair of pumping grooves comprising the first pumping groove 10 and second pumping groove 11 is arranged in such a way that the first pumping groove 10 is positioned on the upstream side of the second pumping groove 11 in the circumferential direction, while the low-pressure fluid-side end 10' of the first pumping groove 10 is separated from the high-pressure fluid-side end 11' of the second pumping groove 11 in a radial direction.

Because the first pumping groove 10 is positioned on the upstream side of the second pumping groove 11 in the circumferential direction, as mentioned above, the negative pressure generated by the first pumping groove can be relieved efficiently by means of the dynamic pressure generation effect of the second pumping groove on the downstream side, to prevent vaporous cavitation from occurring. Also because the low-pressure fluid-side end 10' of the first pumping groove 10 and the high-pressure fluid-side end 11' of the second pumping groove 11 are formed in a manner separated in a radial direction, the seal area width needed to prevent stationary leakage can be defined between the low-pressure fluid-side end 10' of the first pumping groove 10 and the high-pressure fluid-side end 11' of the second pumping groove 11, and consequently stable sealability can be achieved in a stationary state.

Now, when the sliding parts undergo relative rotational motion, the sealed fluid that tends to leak toward the low-pressure fluid side is pushed back toward the high-pressure fluid side by means of the pumping action of the first pumping groove 10 open to the high-pressure fluid side, while at the same time vaporous cavitation occurs near the low-pressure fluid-side end 10' (inner periphery side in FIG. 1) of the first pumping groove 10 open to the high-pressure fluid side. At the same time, the second pumping groove 11 open to the low-pressure fluid side (such as the atmosphere side) suctions in any fluid present on the low-pressure fluid side, while generating dynamic pressure near the high-pressure fluid-side end 11' of the second pumping groove 11, and this dynamic pressure is used to relieve the negative pressure near the low-pressure fluid-side end 10' of the first pumping groove 10 open to the high-pressure fluid side, in order to prevent vaporous cavitation from occurring. If no fluid is present on the low-pressure fluid side, the second pumping groove 11 introduces air on the atmosphere side to relieve the negative pressure near the low-pressure fluid-side end 10' of the first pumping groove 10 open to the high-pressure fluid side, in order to prevent vaporous cavitation from occurring.

Note that the term "adjacent" in "the low-pressure fluid-side end 10' of the first pumping groove 10 is arranged adjacent to the high-pressure fluid-side end 11' of the second pumping groove 11" above means that the first pumping groove 10a and second pumping groove 11a are arranged at positions close enough to each other to generate hydrodynamic effects.

Because the negative pressure near the low-pressure fluid-side end 10' of the first pumping groove 10 is relieved to prevent vaporous cavitation from occurring, as mentioned above, generation of deposits is prevented along with consequent attachment and accumulation of foreign matter to/on the sealing face S, thereby allowing the sealability of the sealing face to be maintained in a stable manner.

Example 2

The sliding component pertaining to Example 2 of the present invention is explained by referring to FIG. 4.

In FIG. 4, the same symbols used in Example 1 indicate the same members they represent in Example 1, and duplicate explanations are omitted.

It should be noted that, in FIG. 4, each pair of pumping grooves comprising the first pumping groove 10 and second pumping groove 11 is arranged in such a way that the first pumping groove 10 is arranged along roughly the same line with the second pumping groove 11 in a radial direction, while the low-pressure fluid-side end 10' of the first pumping groove 10 is adjacent to the high-pressure fluid-side end 11' of the second pumping groove 11 along roughly the same line in a radial direction. Additionally, the low-pressure fluid-side end 10' of the first pumping groove 10 and the high-pressure fluid-side end 11' of the second pumping groove 11 are formed in a manner separated in a radial direction, with the pumping grooves constituting the pair of first pumping groove 10 and second pumping groove 11 being divided by the seal area of the sealing face S present in between.

Because the first pumping groove 10 is arranged along roughly the same line with the second pumping groove 11 in a radial direction, the pressure at the negative pressure origin of the first pumping groove can be raised by means of the dynamic pressure generated by the second pumping groove, to suppress occurrence of vaporous cavitation. Also because the low-pressure fluid-side end 10' of the first pumping groove 10 and the high-pressure fluid-side end 11' of the second pumping groove 11 are formed in a manner separated in a radial direction, the seal area width needed to prevent stationary leakage can be defined between the inner periphery-side end of the first pumping groove and the outer periphery-side end of the second pumping groove, and consequently stable sealability can be achieved in a stationary state.

Example 3

The sliding component pertaining to Example 3 of the present invention is explained by referring to FIG. 5.

It should be noted that, in FIG. 5, the same symbols used in Example 1 indicate the same members they represent in Example 1, and duplicate explanations are omitted.

In FIG. 5, each pair of pumping grooves comprising one of the first pumping grooves 10 (e.g., 10a, 10b, and 10c) and one of the second pumping grooves 11 (e.g., 11a, 11b, and 11c, respectively) is arranged in such a way that the one of the first pumping grooves 10 is positioned on the upstream side with respect to the rotation direction of the mating seal face) of the one of the second pumping grooves 11 in the circumferential direction, while a portion (interposed between a drawing line a connected to the low-pressure fluid-side end 10' of the one of the first pumping grooves 10 and a drawing line b intersecting the one of the first pumping grooves 10) overlaps with a portion (interposed between the drawing line a connected to the low-pressure fluid-side end of the one of the second pumping grooves 11 and the drawing line b connected to the high-pressure fluid-side end 11' of the one of the second pumping grooves 11) in a radial direction, and also a portion (interposed between a drawing circle c connected to the low-pressure fluid-side end 10' of the one of the first pumping grooves 10 and a drawing circle d intersecting the one of the first pumping grooves 10) overlaps with a portion (interposed between the drawing circle c intersecting the one of the second pumping grooves 11 and the drawing circle d connected to the high-pressure fluid-side end 11' of the one of the second pumping grooves 11) in the circumferential direction. In other words, the one of the first pumping grooves 10 is positioned on the upstream side of the one of the second pumping grooves 11 in the circumferential direction, and when a midpoint is a middle point defined by a drawing circle e between an inner periphery 21 defined by an inner diameter g and an outer periphery 22 defined by an outer diameter h in a radial direction, the low-pressure fluid-side end 10' of the one of the first pumping grooves 10 extends beyond the midpoint in a radial direction and reaches almost a midway point which is a middle point defined by a drawing circle f between the drawing circle e and the inner periphery 21 in a radial direction, while the high-pressure fluid-side end 11' of the one of the second pumping grooves 11 extends to a position a little beyond the midpoint in a radial direction. Note that the drawing lines a and b and the drawing circles c, d, e, and f do not represent any seal elements but only define the above-described end points and intersecting points of the grooves.

Because the first pumping groove 10 is positioned on the upstream side of the second pumping groove 11 in the circumferential direction, as mentioned above, the negative pressure generated by the first pumping groove can be relieved efficiently by means of the dynamic pressure generation effect of the second pumping groove on the downstream side, to prevent vaporous cavitation from occurring. Also because the low-pressure fluid-side end 10' of the first pumping groove 10 and the high-pressure fluid-side end 11' of the second pumping groove 11 are arranged in a manner overlapping in a radial direction, occurrence of vaporous cavitation can be prevented more reliably by means of the dynamic pressure generating near the high-pressure fluid-side end 11' of the second pumping groove 11, even when such vaporous cavitation occurring near the low-pressure fluid-side end 10' of the first pumping groove 10 is expansive in a radial direction.

Example 4

The sliding component pertaining to Example 4 of the present invention is explained by referring to FIG. 6.

It should be noted that, in FIG. 6, the same symbols used in Example 1 indicate the same members they represent in Example 1, and duplicate explanations are omitted.

In FIG. 6, the first pumping groove 10 is positioned on the upstream side of the second pumping groove 11 in the circumferential direction, while the low-pressure fluid-side end 10' of the first pumping groove 10 and the high-pressure fluid-side end 11' of the second pumping groove 11 are arranged in a manner overlapping in a radial direction, on the inner periphery side of the sealing face as shown in FIG. 5. In addition, the sealing face on the high-pressure fluid side of the first pumping groove 10 is provided with a positive-pressure generation mechanism 12 as well as a pressure-release groove 13 positioned between the first pumping groove 10 and positive-pressure generation mechanism 12. Also, the positive-pressure generation mechanism 12 and pressure-release groove 13 are open to the high-pressure fluid side via a radial direction groove 15, while the high-pressure fluid-side end of the first pumping groove 10 is open to the pressure-release groove 13.

Preferably the positive-pressure generation mechanism 12 is constituted by a Rayleigh step mechanism 14, for example. Multiple Rayleigh step mechanisms 14 are provided in the circumferential direction and made open to the high-pressure fluid side via the radial-direction grooves 15. In other words, the seal area of the sealing face S is present between adjacent Rayleigh step mechanisms 14, and the upstream side of a groove 16 of each Rayleigh step mechanism 14 is open to the radial-direction groove 15, while a step 17 is formed between the downstream side of the groove 16 and the seal area of the sealing face S. Additionally, the groove 16 is not directly open to the high-pressure fluid side because of the presence of the seal area of the sealing face S, but is open to the high-pressure fluid side via the radial-direction groove 15 on its upstream side. On the other hand, the pressure-release groove 13 is constituted by a circumferential groove, provided between the first pumping groove 10 and positive-pressure generation mechanism 12 in a radial direction and open to multiple radial-direction grooves 15. The seal area of the sealing face S is present between the pressure-release groove 13 and positive-pressure generation mechanism 12.

In this example, the positive pressure generated by the positive-pressure generation mechanism 12 widens the space between the sealing faces S, the result of which is a formation of liquid film and consequent improvement of lubrication property. As this happens, the positive pressure generated by the positive-pressure generation mechanism 12 is introduced into the pressure-release groove 13 and escapes toward the high-pressure fluid side, without leaking much toward the low-pressure fluid side. In addition, fluid that flows past the pressure-release groove 13 and tends to leak toward the low-pressure fluid side is pushed back toward the high-pressure fluid side by means of the pumping action of the first pumping groove 10, being introduced into the pressure-release groove 13 and escaping toward the high-pressure fluid side.

According to this example, negative pressure near the low-pressure fluid-side end 10' of the first pumping groove 10 is relieved and occurrence of vaporous cavitation is prevented, which in turn prevents generation of deposits and consequent attachment and accumulation of foreign matter to/on the sealing face, thereby allowing the sealability of the sealing face to be maintained in a stable manner, even when the sliding component is designed to enhance lubrication property with a positive-pressure generation mechanism 12 provided on the sealing face that already has the first pumping groove 10.

Example 5

The sliding component pertaining to Example 5 of the present invention is explained by referring to FIG. 7.

It should be noted that, in FIG. 7, the same symbols used in Example 4 indicate the same members they represent in Example 4, and duplicate explanations are omitted.

As shown in FIG. 7, the constitution of the positive-pressure generation mechanism 12 in this example is slightly different from that in Example 4 as shown in FIG. 6, but the constitutions of the remainder are the same as those in Example 4.

The positive-pressure generation mechanism 12 in this example is constituted by a Rayleigh step mechanism 14, but each groove 16 is directly open to the high-pressure fluid side on its high-pressure fluid side, while its upstream side is open to the radial-direction groove 15 and a step 17 is formed between the downstream side and the seal area of the sealing face S.

The foregoing explained the examples of the present invention using the drawings, but it should be noted that specific constitutions are not limited to those in these examples and that modifications and additions are also included in the scope of the present invention so long as they do not deviate from the key points of the present invention.

In the examples explained above, for example, each sliding part was used in only one of the pair of seal rings—one that rotates and the other that remains stationary—that constitute the mechanical seal; however, it is possible to use the sliding component for a bearing that slides against a rotating shaft while sealing lubricating oil on one side of a cylindrical sealing face in the axial direction.

Another example is that, while high-pressure sealed fluid was present on the outer periphery side in the examples explained above, the present invention can also be applied when high-pressure fluid is on the inner periphery side.

Yet another example is that, while the arrangement in the examples explained above pairs one first pumping groove 10a with one second pumping groove 11a; however, the present invention is not at all limited to the foregoing and there may be multiple second pumping grooves 11a to one first pumping groove 10a, or vice versa. Additionally, arranging the first pumping grooves 10a and second pumping grooves 11a tightly in the circumferential direction does not necessarily mean they should be paired because, in essence, all that is required is for the negative pressure near the low-pressure fluid-side end 10' of the first pumping groove 10 to be relieved by the dynamic pressure generating near the high-pressure fluid-side end 11' of the second pumping groove 11 so that occurrence of vaporous cavitation can be prevented.

DESCRIPTION OF SYMBOLS

1 Rotating shaft
2 Sleeve
3 Rotating ring
4 Housing
5 Stationary ring
6 Coiled wave spring
7 Bellows
10 First pumping groove
10' Low-pressure fluid-side end
11 Second pumping groove
11' High-pressure fluid-side end
12 Positive-pressure generation mechanism
13 Pressure-release groove
14 Rayleigh step mechanism
15 Radial-direction groove
16 Groove
17 Step
S Sealing face

The invention claimed is:

1. A sliding component characterized in that an annular sealing face of one of a pair of sliding parts that slide relative to each other, which annular sealing face is defined by an inner periphery defined by an inner diameter and an outer periphery defined by an outer diameter, is provided with:
   a first pumping groove that is open to a high-pressure fluid side through the outer periphery but isolated from a low-pressure fluid side by a seal area and also angled to discharge a fluid toward the high-pressure fluid side by sliding relative to a mating sealing face, and
   a second pumping groove that is open to the low-pressure fluid side through the inner periphery but isolated from the high-pressure fluid side by the seal area and also angled to discharge the fluid toward the high-pressure fluid side by sliding relative to the mating sealing face,
   wherein a low-pressure fluid-side end of the first pumping groove is arranged adjacent to a high-pressure fluid-side end of the second pumping groove,
   the first pumping groove and second pumping groove are respectively provided in plurality in a circumferential direction and the first pumping grooves and the respective second pumping grooves are arranged as pairs, respectively,
   each pair of pumping grooves comprising one of the first pumping grooves and one of the second pumping grooves is arranged in such a way that the one of the first pumping grooves is positioned on an upstream side of the one of the second pumping grooves in the circumferential direction, wherein the upstream side is defined with respect to a rotating direction of the mating sealing face, and
   each pair of pumping grooves comprising the one of the first pumping grooves and the one of the second pumping grooves is formed in such a way that a portion of the one of the first pumping grooves on the low-pressure fluid side and a portion of the one of the second pumping grooves on the high-pressure fluid side overlap as viewed both in a radial direction and in the circumferential direction, where the low-pressure fluid-side end of the one of the first pumping grooves extends beyond a midpoint in a radial direction and reaches almost a midway point between the midpoint and the inner periphery in a radial direction, while the high-pressure fluid-side end of the one of the second pumping grooves extends to a position a little beyond the midpoint toward the outer periphery in a radial direction, wherein the midpoint is a middle point between the inner periphery and the outer periphery in a radial direction.

2. A sliding component according to claim 1, characterized in that the first pumping groove and second pumping groove are formed in spiral shapes.

* * * * *